United States Patent
Baasch Sørensen et al.

(10) Patent No.: US 9,851,163 B2
(45) Date of Patent: Dec. 26, 2017

(54) REGULATING METHOD FOR A HEATING AND/OR COOLING SYSTEM WITH AT LEAST ONE LOAD CIRCUIT

(71) Applicant: GRUNDFOS HOLDING A/S, Bjerringbro (DK)

(72) Inventors: Erik Baasch Sørensen, Bjerringbro (DK); Martin Clausen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 535 days.

(21) Appl. No.: 14/534,641

(22) Filed: Nov. 6, 2014

(65) Prior Publication Data
US 2015/0122475 A1    May 7, 2015

(30) Foreign Application Priority Data
Nov. 7, 2013   (EP) ..................... 13192028

(51) Int. Cl.
| | | |
|---|---|---|
| *G05D 23/00* | (2006.01) | |
| *F24F 11/00* | (2006.01) | |
| *G05D 23/19* | (2006.01) | |
| *F28F 13/00* | (2006.01) | |
| *G05D 23/185* | (2006.01) | |
| *F24D 3/00* | (2006.01) | |
| *F24D 3/08* | (2006.01) | |
| *F24D 19/10* | (2006.01) | |

(Continued)

(52) U.S. Cl.
CPC ............. *F28F 27/02* (2013.01); *F24D 3/12* (2013.01); *F24D 19/1009* (2013.01); *G05D 23/1951* (2013.01); *G05D 23/1333* (2013.01)

(58) Field of Classification Search
CPC ........... G05D 23/1951; G05D 23/1313; G05D 23/1333
USPC ....... 236/12.11; 237/8 C; 165/108, 267–270, 165/296, 297; 137/339
See application file for complete search history.

(56) References Cited

U.S. PATENT DOCUMENTS 2,751,156 A * 6/1956 Morgan .............. F24D 19/1006
236/12.14
4,293,028 A * 10/1981 Knoll ....................... F24F 11/06
165/239

(Continued)

FOREIGN PATENT DOCUMENTS

DE           43 12 800 A1     9/1993
DE           EP 0729086 A2 *  8/1996 ......... F24D 19/1012

(Continued)

*Primary Examiner* — Len Tran
*Assistant Examiner* — Paul Alvare
(74) *Attorney, Agent, or Firm* — McGlew and Tuttle, P.C.

(57) ABSTRACT

A regulating method for a heating and/or cooling system uses at least one load circuit (6), through which a fluid as a heat transfer medium flows and switches the at least one load circuit (6) on and off in dependence on a room temperature in a room to be thermally regulated by the at least one load circuit (6). A feed temperature ($T_{mix}$) of the fluid fed to the at least one load circuit (6) is set in dependence on the relative switch-on duration (D) of the at least one load circuit (6). A manifold device is also provided for a heating and/or cooling system with a control device for carrying out such a regulating method.

16 Claims, 5 Drawing Sheets

(51) Int. Cl.
    *F28F 27/02*     (2006.01)
    *F24D 3/12*     (2006.01)
    *G05D 23/13*     (2006.01)

(56) References Cited

U.S. PATENT DOCUMENTS

| | | | |
|---|---|---|---|
| 8,230,911 B2 * | 7/2012 | Seerup | F24D 3/12 165/101 |
| 2007/0029396 A1 * | 2/2007 | Braun | F01P 7/167 236/34.5 |
| 2011/0290328 A1 * | 12/2011 | Jonsson | F24D 3/1066 137/1 |

FOREIGN PATENT DOCUMENTS

| | | | | |
|---|---|---|---|---|
| DE | EP 0730213 A2 * | 9/1996 | ......... | F24D 19/1009 |
| DE | 10 2007 037116 A1 | 11/2008 | | |
| EP | 0 729 186 A2 | 8/1996 | | |
| EP | 0 730 213 A2 | 9/1996 | | |
| EP | 1 355 212 A1 | 10/2003 | | |
| EP | 2 103 890 A1 | 9/2009 | | |
| EP | 2 442 052 A1 | 4/2012 | | |
| NL | WO 2008039065 A1 * | 4/2008 | ......... | F24D 19/1009 |
| NO | WO 03038343 A1 * | 5/2003 | ......... | F24D 19/1048 |
| WO | 03/038343 A1 | 5/2003 | | |
| WO | 2004/083733 A1 | 9/2004 | | |

* cited by examiner

REGULATING METHOD FOR A HEATING AND/OR COOLING SYSTEM WITH AT LEAST ONE LOAD CIRCUIT

CROSS REFERENCE TO RELATED APPLICATIONS

This application claims the benefit of priority under 35 U.S.C. §119 of European Patent Application EP 13 192 028.2 filed Nov. 7, 2013, the entire contents of which are incorporated herein by reference.

FIELD OF THE INVENTION

The invention relates to a regulating method for a heating and/or cooling system with at least one load circuit, through which a fluid as a heat transfer medium flows.

BACKGROUND OF THE INVENTION

Heating and cooling systems are known, which comprise at least one load circuit, through which fluid as a heat transfer medium flows. This can be water for example. Such a system can for example be provided as a heating installation in a building, wherein preferably several load circuits are present. The load circuits are switched on and off in the known manner in dependence on the room temperature, which can be effected for example via room thermostats. Thus, in the case of a heating system, the load circuit is switched on when falling short of a desired temperature and the load circuit is switched off on exceeding or reaching a desired temperature.

SUMMARY OF THE INVENTION

It is an object of the invention, to provide an improved regulating method for such a heating and/or cooling system, which permits the reduction of the energy consumption and an improvement of the comfort.

The regulating method according to the invention is provided for a heating and/or cooling system which uses a fluid as a heat transfer medium. The fluid is thereby preferably delivered through at least one load circuit by a circulation pump, wherein the load circuit extends through the room to be heated or cooled, for example with a floor heating in the floor, or for example through radiators or other suitable heat exchangers in the room. The load circuit is switched on and off in dependence on a room temperature in a room to be thermally regulated, i.e. to be heated or cooled by the load circuit. I.e. if a certain desired temperature is reached by way of heating or cooling, the load circuit for example is closed for example by way of closing a valve or switching off a delivery pump. Vice versa, the load circuit is switched on given a deviation from a desired temperature, by way of opening a valve or by way of switching on a delivery pump. According to the invention, one envisages setting a feed temperature of the fluid fed to the at least one load circuit, in dependence on the switch-on duration, i.e. a relative switch-on time of the at least one load circuit, in order to be able to optimally adapt the quantity of heat fed to the room to be thermally regulated (in the case of a heating system) or of the heat to be removed from the room (in the case of a cooling system), in an optimal manner. I.e. the feed temperature is changed, i.e. increased or decreased in dependence on the switch-on duration. This permits preferably a as long as possible and relative switch-on durations of the load circuit, by which means a uniform heat supply or removal respectively into and out of the room to be thermally regulated is made possible. This increases the comfort and simultaneously reduces the energy consumption.

With regard to the switch-on duration, it is preferably the case of a relative switch-on duration, i.e. the ratio of the switch-on duration or switch-on time to the time period between a switching-on of the load circuit and a subsequent renewed switching-on of the load circuit, i.e. with regard to the switch-on duration, it is preferably the case of the load cycle or the switch-on ratio, i.e. the ratio between the switch-on time and the cycle time. It is to be understood with the meaning of the invention that instead of the relative switch-on duration the consideration of the relative interrupting time is to be distinguished as equivalent to the consideration of the relative switch-on duration. Relating to the cycle time the relative interrupting time respectively represents the turn-off time, i.e. the time period between a switching-on of the load circuit and a subsequent renewed switching-on or between switching-off of the load circuit and a subsequent renewed switching-off of the load circuit. Since an excess of a predefined relative switch-on duration leads to a modification of the feed temperature, an excess of a relative switch-off duration respectively leads to a respective modification of the feed temperature. I.e. the relative switch-on duration and the relative switch-off duration are exchangeable here.

According to a preferred embodiment of the invention, the load circuit is used for heating a room and the feed temperature is increased when the relative switch-on duration exceeds a predefined limit value, and/or the feed temperature is reduced when the relative switch-on duration falls short of a predefined limit value. With the limit values of the relative switch-on duration, it can be the case of a single limit value or of a region with a lower and with an upper limit, wherein the feed temperature is increased on reaching the upper limit or exceeding the upper limit and the feed temperature is reduced on reaching or falling short of the lower limit.

Accordingly, the regulating method is preferably designed for a cooling system such that the load circuit is used for cooling a room and the feed temperature is reduced when the relative switch-on duration exceeds a predefined limit value and/or the feed temperature is increased when the relative switch-on duration falls short of a predefined limit value. Thereby, here too, the limit value can be an individual limit value or be formed by upper and lower limits of a desired region, wherein the feed temperature is lowered on reaching or exceeding the upper limit and is increased on reaching or falling short of the lower limit.

Particularly preferably, the feed temperature is changed by a proportional amount on falling short of or exceeding the predefined limit value. I.e. the feed temperature is not changed by a fixed amount, but by an amount which depends on how greatly the limit value for the relative switch-on duration is exceeded or fallen short of. I.e. the feed temperature is changed by an accordingly greater amount with a greater exceeding of the limit temperature. However, it is to be understood that alternatively the feed temperature can also be increased and/or lowered in fixed steps, independently of how large the deviation of the duration from the mentioned limits is.

According to a preferred embodiment, a mixing device is used for setting the feed temperature, in which mixing device fluid fed to the at least one load circuit is mixed with fluid from a return of the at least one load circuit. Such mixing devices are for example common with floor heating systems, in which a higher feed temperature is reduced by way of admixing fluid, for example water, from the return. Vice versa, in a cooling system, the feed temperature could be increased by way of admixing warmer fluid from the return. The feed temperature can be set or adapted by way of a change of the admixing ratio.

Preferably, the regulating method according to the invention is used for several load circuits. I.e. preferably, several load circuits are present and the relative switch-on duration of that load circuits which has the greatest relative switch-on duration forms the basis for setting the fed temperature of a fluid commonly fed to the load circuits. Here too, it is the case of the relative switch-on durations, as has been described above, i.e. the case of the ratios between the switch-on time and the total cycle time. That load circuit which has the longest relative switch-on duration has the greatest heating or cooling requirement. Inasmuch as this is concerned, it is preferable to adapt the feed temperature to this load circuit, so that the maximal heating output or cooling output is led to this load circuit by way of adapting the feed temperature. The adaptation in the other rooms which are cooled or heated by the other load circuits is then effected accordingly by way of shortening the switch-on duration, which corresponds to the known control or regulating methods.

Particularly preferably, the room temperature is detected in a room to be thermally regulated by the load circuit, and the load circuit is switched off by way of interrupting the volume flow, for example by way of closing a valve or switching off a pump, when the room temperature reaches a temperature setpoint. Accordingly, the load circuit is switched on again given a deviation from the temperature setpoint. With regard to the temperature setpoint, it can be the case of a fixed value or of a temperature interval, wherein the temperature interval has an upper and a lower limit value. In a heating system, the load circuit can be switched off on reaching the upper limit value and switched on when reaching a lower limit value. In a cooling system this then preferably functions in exactly the opposite manner, i.e. the load circuit is switched on when reaching the upper temperature value and is switched off again on reaching the lower temperature value. In the case that several load circuits are provided, preferably all load circuits are switched-on and off in this manner, i.e. in each room which is thermally regulated by the load circuit, the room temperature is detected and the associated load circuit is accordingly switched on and off. This corresponds to the normal operation of floor heating.

According to a further preferred embodiment of the invention, an entry temperature of the fluid at an entry of the load circuit and an exit temperature at an exit of the load circuit are detected and a temperature difference between the entry temperature and the exit temperature is determined and a volume flow of the fluid through this load circuit is set in dependence on the temperature difference. The setting of the volume flow can e.g. be effected via a regulating valve. By way of this regulating method, it is possible to exactly adapt the energy quantity which is led to the load circuit or which is taken from the load circuit in the case of a cooling system, to the heating or cooling requirement of a room to be thermally regulated by the load circuit. I.e. it is not a constant volume flow which flows through the load circuit as is common in known systems, but rather the volume flow is adapted to the heat requirement or cooling requirement in dependence on the detected temperature difference. A reduction of the energy consumption and a more comfortable thermal regulation of a room can be achieved by way of this.

According to a further preferred embodiment, the regulating method serves for the regulation of several load circuits, wherein a common circulation pump for delivering the fluid through the load circuits is present for the several load circuits, wherein preferably the rotational speed of the circulation pump is regulated in a manner such that a differential pressure across the circulation pump corresponds to a predefined pressure difference setpoint. The differential pressure across the pump, i.e. between the entry and exit of the pump thereby corresponds to the differential pressure between the entry and exit of the load circuit or load circuits. The differential pressure regulation can be effected by way of speed regulation of the circulation pump. By way of this differential pressure regulation, one succeeds in the fluid being fed to the load circuits at a regulated, preferably constant pressure. Thereby, the pressure difference setpoint as the case may be can be adapted to different operating conditions, i.e. changed.

Particularly preferably, the pressure difference setpoint for the differential pressure across the circulation pump is set in dependence on the opening degree of at least one regulating valve for setting the volume flow in the load circuits. Preferably, regulating valves for setting the volume flow in the load circuits are provided, wherein an individual regulating valve is provided for each load circuit. One succeeds in the fluid pressure of the fluid fed to the load circuits being adapted to the opening degree of the regulating valves, i.e. in particular the pressure can be increased given valves open greatly and the pressure reduced given regulating valves closed to further extent, by way of the fact that the pressure difference setpoint, to which the differential pressure between the entry side and exit side of the circulation pump is regulated, is adapted to the opening degree of at least one regulating valve.

Particularly preferably, it is that regulating valve which is opened the furthest which is considered for setting the pressure difference setpoint for the differential pressure across the circulation pump. I.e. if several load circuits are present with several regulating valves, preferably only one regulating valve is considered for setting the pressure difference setpoint, wherein the pressure difference setpoint is set in dependence on the opening degree of this regulating valve. Thereby, it is useful to consider that regulating valve which is opened the furthest, since this belongs to the load circuit which has the greatest heating or cooling requirement, so that it is ensured that the heating output or cooling output is sufficient for this load circuit.

For setting the pressure difference setpoint, the opening degree of the regulating valve taken as a basis is compared to a desired opening degree, and the pressure difference setpoint is increased on exceeding the desired opening degree whilst the pressure difference setpoint is reduced on falling short of the desired opening degree. The desired opening degree can be a fixed value or an opening degree region, wherein the pressure difference setpoint is reduced on falling short of the lower limit of the region and the pressure difference setpoint is accordingly increased on exceeding the upper limit. The pressure difference setpoint can thereby be changed in fixed steps or however proportionally to the change of opening degree.

Ideally, the regulating method comprises several control loops, as have been previously described. A first control loop regulates the feed temperature of the at least one load circuit in the manner described above, in dependence on the switch-on duration of the at least one load circuit. A second control loop regulates the volume flow through the load circuit in dependence on the entry and exit temperatures in the manner mentioned above. A third control loop regulates the differential pressure across the circulation pump, i.e. the pressure difference between the exit side and entry side of the load circuit in the manner mentioned above. Moreover, a fourth control loop can regulate the pressure difference setpoint in the manner described above, in dependence on the opening degree of a regulating valve as well as further control loops can regulate the room temperature by switching-on and switching-off the load circuits as well as these further control loops can also regulate the feed temperature to the adjusted feed temperature setpoint. These control loops are superimposed on one another and the respective regulations preferably take their course in a simultaneous and continuous manner. Thereby, the regulations are preferably effected with a different speed or different sluggishness. Thereby, the quickest control loop is that one which carries out the pressure regulation of the circulation pump. This control loop sets the speed of the pump such that the desired pressure difference setpoint is achieved. The control loop which regulates the feed temperature, i.e. the control loop which regulates the feed temperature on the selected feed temperature setpoint is slower designed than this control loop. The next slower control loop is preferably the control loop which sets the volume flow through the load circuit in dependence on the temperature difference, as has been described above. This regulation is usefully only active for the respective load circuit when this is switched on. The control loop which sets the pressure difference setpoint in dependence on the opening degree of the regulating valve is even slower. This regulation is effected so slowly that it preferably does not interact with the volume flow regulation. The next slower control loop is the control loop which regulates the room temperature by switching-on and switching-off the load circuit. The slowest load circuit is that load circuit which sets and regulates the feed temperature setpoint.

The subject matter of the invention, apart from the previously described regulating method is furthermore a manifold device for a heating system and/or cooling system with at least one load circuit, for example a manifold device for a floor heating system. The manifold device, according to the invention, comprises at least one circulation pump for delivering a fluid as a heat transfer medium through the at least one load circuit. In the case that several load circuits are present, the circulation pump is preferably provided for delivering the fluid through all load circuits which are connected in parallel to one another. As the case may be, several circulation pumps can be connected in parallel or series, in order to increase the delivery output, wherein such arrangements of circulation pumps are to be seen as one circulation pump in the context of the invention.

The manifold device according to the invention moreover comprises a feed temperature setting device for setting the feed temperature of a fluid fed to the at least one load circuit. In the case that several load circuits connected in parallel are present, this is the feed temperature for all load circuits. The feed temperature setting device is designed to be able to change the feed temperature. The feed temperature setting device for this can comprise a heat exchanger or a mixing device. According to the invention, the feed temperature setting device is connected to a control device which activates or regulates the feed temperature setting device. Thereby, the control device is designed such that it carries out a regulating method for setting the feed temperature according to the preceding description, which is referred to at this location. I.e. the control device is designed in order to set the feed temperature of the fluid in dependence on the switch-on duration of a load circuit. For this, the control device is provided with detection means which detect the switch-on duration or the switch-on time and switch-off time of the load circuit or of the load circuits.

Preferably, the control device simultaneously serves for the activation of the individual load circuits and thus the relative switch-on durations or the switch-on time and switch-off time are known to the control device due to the activation of the load circuits which is carried out by it. The control device thus preferably also serves for switching the load circuits on and off, by way of it opening and closing the valves in the individual load circuits. For this, the control device can be connected via suitable communication means, for example electrical connections or radio connections, to room thermostats in the rooms to be thermally regulated as well as to the valves. The control device switches the load circuits assigned to the respective rooms on and off in the manner described above, in dependence on the detected temperature signals. The control device can moreover assume further functions such as for example the volume flow regulation described above, by way of activating regulating valves of the individual load circuits. The regulating valves can simultaneously serve as valves for switching the load circuits on and off. Particularly preferably, the control device moreover serves for the control of the circulation pump, i.e. for speed control in the manner described above. The complete control device can be integrated into the circulation pump assembly, i.e. the circulation pump or its electronics housing.

Particularly preferably, the feed temperature setting device comprises a mixing device, in which fluid fed to the at least one load circuit is mixed with fluid from a return of the at least one load circuit. In the case of a heating system, colder fluid from the return is admixed to fluid which is heated by a heat source such as a boiler and which has a higher temperature, in order to reduce the temperature of the fluid to the desire feed temperature. In a cooling system, accordingly warmer fluid from the return can be admixed to a fluid which is cooled by a cooling device and has a temperature which is lower than the desired feed temperature, in order to lift the temperature of the fluid to the desired feed temperature. Thereby, the temperature can be set to the desired feed temperature setpoint by way of changing the admixing degree of the fluid from the return. The admixing degree can for example be set via a regulating valve, such as a proportional valve which is activated by the control device.

For this, the mixing device can comprise a valve for regulating the flow and whose opening degree is settable by the control device, in a fluid feed or in a mixing conduit which connects the return of the load circuit or of several load circuits to the entry of the at least one load circuit or of the several load circuits. For this, the control device is connected to the valve via suitable connection means, for example electric control leads. Moreover, a temperature sensor of the mixing device is preferably provided on the output side, which detects the actual set feed temperature and reports back the control device for controlling the mixing device.

In the case that several load circuits are provided, as has already been described above, it is preferable for the feed temperature setting device is designed for setting the feed temperature of a fluid fed to all load circuits. The feed temperature is thereby adapted to the requirements of that load circuit which has the greatest thermal requirement. For this, the control device is designed such that it sets the feed temperature in the manner described above, in dependence on the relative switch-on duration of that load circuit which has the longest relative switch-on durations.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
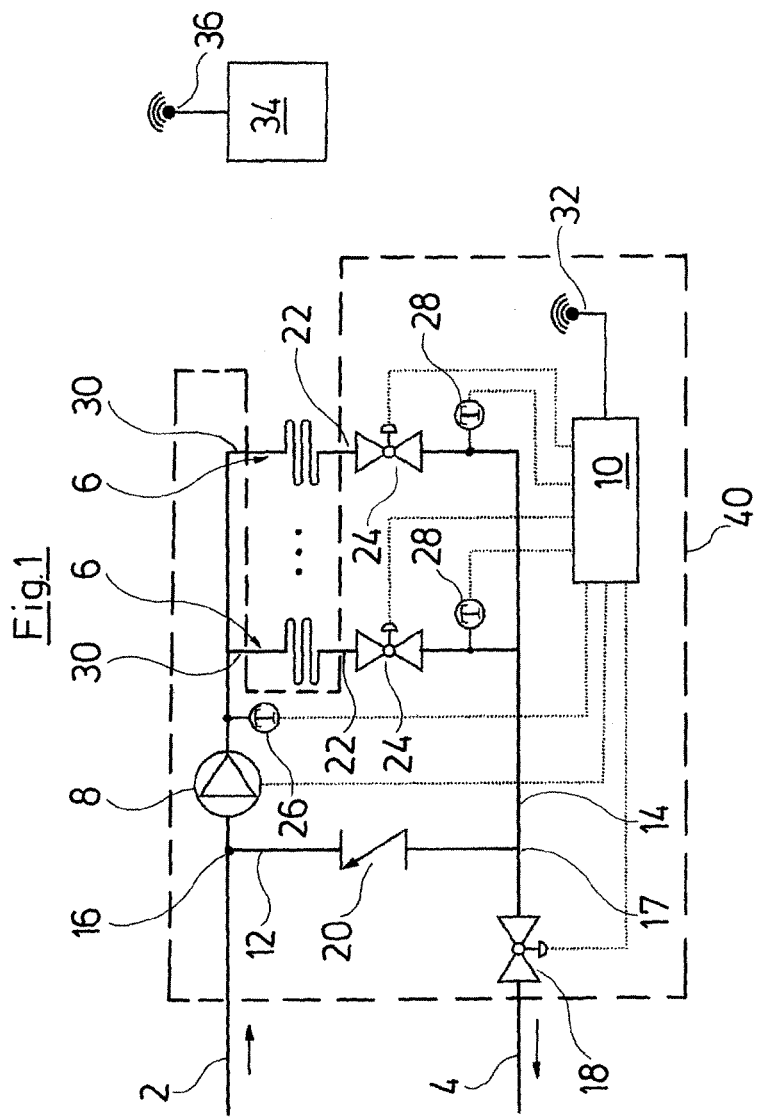
FIG. 1 is a schematic view showing a heating or cooling system, in which the regulating method according to the invention as well as the manifold device according to the invention are applied.

Referring to the drawings, FIG. 1 shows a heating or cooling system which can be designed for example as a floor heating system. Hereinafter, the invention is described with the example of a heating system. However, it is to be understood that the invention could also be correspondingly realized as a cooling system. Alternatively, the system can also be applied as a heating as well as for cooling, i.e. for example in winter as a heater and as a cooling system in summer.

The heating system shown in FIG. 1 comprises an inlet 2 and an outlet 4 which are provided for connection to a supply, i.e. for example to a boiler, to a heat reservoir or to a cooling installation etc. Moreover, several load circuits 6 are provided, which for example represent individual floor heating circuits which in each case heat a part region such as a room of a building. A circulation pump or a circulation pump assembly 8 is arranged at the entry side, i.e. upstream of the load circuits 6. This pump or pump assembly comprises a speed-regulated drive motor and is connected to a control device 10 for the activation and in particular for setting the speed. The entry side of the circulation pump assembly 8 is connected to the inlet 2.

Moreover, a mixing device is arranged upstream of the circulation pump assembly 8. The mixing device comprises a mixing conduit 12 which connects a return 14 from the load circuits 6 to a mixing point 16 in the flow path from the inlet 2 to the circulation pump 8. I.e. fluid from the inlet 2 is mixed with fluid from the return 14, at the mixing point 16, in order to be able to set the feed temperature. A regulating valve which forms a mixing valve 18 is arranged in the return 14, downstream of the branching 17 of the mixing conduit 12 in the return 14, for the regulation of the mixing ratio. This is likewise signal-connected to the control device 10 for its activation. Moreover, a check valve 20 is arranged in the mixing conduit 12 and prevents the backflow of fluid from the mixing point 16 into the return 14. The volume flow which flows out of the return 14 to the outlet 4 changes in a manner depending on the opening degree of the mixing valve 18. If the volume flow is reduced by way of a reduction of the opening degree of the mixing valve 18, a greater share of the fluid flows through the mixing conduit 12 to the mixing point 16. If the opening degree of the mixing valve 18 increases, the volume flow through the outlet 4 increases and accordingly a smaller share of the fluid flow flows from the return 14 through the mixing conduit 12 to the mixing point 16. Thus, the share of fluid from the return 14 and which is admixed at the mixing point 16 to the fluid out of the inlet 2 changes. The feed temperature of the fluid from the inlet 2 can be lowered by way of the mixing of the fluid from the return 14 and which is colder in the case of a heating system, with the warmer fluid from the inlet 2. In the case of a cooling system, vice versa warmer fluid from the return 14 is admixed to the colder fluid from the inlet 2, in order to increase the feed temperature. The circulation pump 8 delivers the fluid from the mixing point 16 to the load circuits 6 arranged in parallel.

In each case, a regulating valve 24 is arranged at the exits 22 of the load circuits, i.e. in their returns, and this valve is designed as an electromotorically driven regulating valve 24 and is activated by the control device 10. The regulating valves 24 can be varied in their opening degree and also be completely closed, in order to set the flow or volume flow through each individual load circuit 6. Thereby, the regulating valves 24 can be individually activated by the control device 10, so that an adaptation of the flow through each individual load circuit 6 is possible independently of the remaining load circuits.

Moreover, temperature sensors are provided in the shown system. A first temperature sensor is a feed temperature sensor 26 and detects the feed temperature of the fluid which is fed to the load circuits 6. Moreover, temperature sensors 28 are arranged at the exits 22 of the load circuits 6 and detect the exit temperatures of the fluid from the individual load circuits 6. The temperature values which are detected by the feed temperature sensor 26 and the temperature sensors 28 are led via suitable communication connections likewise to the control device 10.

The circulation pump assembly 8 is moreover designed to determine a differential pressure $H_{pu}$ between the entry side and the exit side of the circulation pump assembly 8 and which simultaneously corresponds to the differential pressure between the entries 30 and the mixing point 16, i.e. which corresponds to the pressure drop via each branches between these points which are defined by the load circuit 6. Moreover, the circulation pump assembly 8 is designed to determine the flow through the circulation pump assembly 8. These values detected by the circulation pump assembly 8 are likewise led via a signal connection to the central control device 10. Alternatively, suitable pressure sensors and flow sensors could be arranged additionally to the circulation pump assembly 8, in order to determine the pressure difference between the entry and exit of the load circuits 6 as well as the flow through all load circuits 6.

On basis of the differential pressure $H_{pu}$, i.e. the pressure drop via the load circuit can be used in regard to the characteristic of the valves lying in the flow path, particularly of the check valve 20 and the regulating valve 24, moreover, the volume flow through each load circuit 6 depending on the opening degree of the per-respective valve 24 can be determined. Since the controller 10 controls the opening degree of the regulating valves 24, the control device 10 can determine the flow rate or volume flow rate through the associated load circuit 6 from the said values.

Thus, as described below, a desired flow rate can be adjusted by the load circuit 6.

The control device 10 is moreover provided with a communication interface 32 which is designed to communicate with one or more room thermostats 34 or room temperature probes 34. Such a room thermostat 34 is preferably provided in each room which is to be thermally regulated by a load circuit 6. In the shown example, the communication interface 32 is designed as a radio interface which communicates with corresponding radio interface 36 of the room thermostat 34. Alternatively, a lead connection via a separate signal lead, a bus system or a powerline communication could be provided. The room thermostats 34 detect the room temperatures in the rooms to be thermally regulated. Moreover, a desired temperature for the room to be thermally regulated can be set by the user in each case in the known manner via the room thermostats 24.

The control device 10 is designed for the use of different regulating methods. Thus, according to a first regulating method, the control device 10 effects a volume flow regulation for the individual load circuits 6. For this, the temperature difference $\Delta T$ between the entry 30 and the exit 22 of each load circuit 6 is detected. This is effected via the feed temperature sensor 26 as well as the temperature sensor 28 belonging to the respective load circuit 6. The volume flow is regulated or set by the control device 10 by changing the opening degree $V_{pos,n}$ of the regulating valve 24 in dependence on this temperature difference $\Delta T$, via the regulating valve 24 of this load circuit 6, so that the temperature difference $\Delta T$ corresponds to a predefined setpoint which is stored in the control device 10, i.e. that $\Delta T$ is kept constant. This is effected independently for each load circuit 6, so that all load circuits can be adapted by the volume flow regulation to the actual energy requirement. The setpoint can be the same for all load circuits 6 or different setpoints can be defined for individual load circuits. The setpoints are stored in the control device 10.

Thereby, the circulation pump assembly 8 is regulated by the control device 10 such that it maintains a predefined pressure difference setpoint between the entry and exit of the circulation pump assembly. This differential pressure is thus regulated to a pressure difference setpoint which is likewise set or defined by the control device 10. The pressure difference setpoint $H_{ref}$ is set by the control device 10 in dependence on the opening degree of the regulating valves 24. For this, all opening degrees of all regulating valves 24 are considered by the control device 10. That regulating valve which is presently open the furthest, i.e. has the greatest opening degree, then forms the basis of the setting of the pressure difference setpoint by the control device 10. Thus, the opening degree of the regulating valve which is open the furthest, is compared to a desired opening degree $V_{pos,ref}$. If the present or current opening degree $V_{pos,n}$ of the regulating valve 24 with the greatest opening degree exceeds the desired opening degree $V_{pos,ref}$, then the pressure difference setpoint $H_{ref}$ is increased. If the desired opening degree $V_{pos,ref}$ is fallen short of by the actual opening degree $V_{pos,n}$, then the pressure difference setpoint $H_{ref}$ is accordingly lowered. The increase or lowering is preferably effected proportionally to the deviation from the desired opening degree $V_{pos,ref}$.

Figure 4:
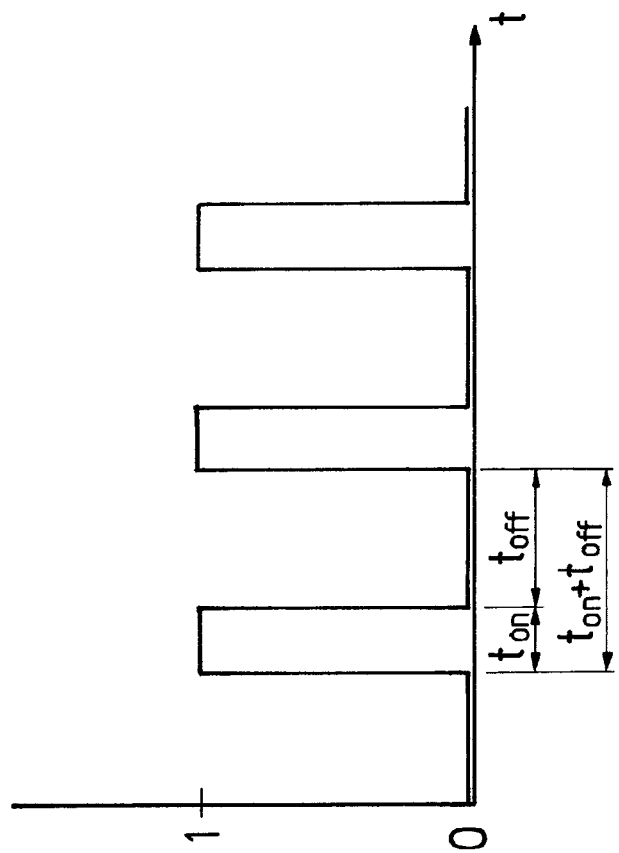
FIG. 4 is a view showing the switch-on durations of a load circuit.
Figure 5:
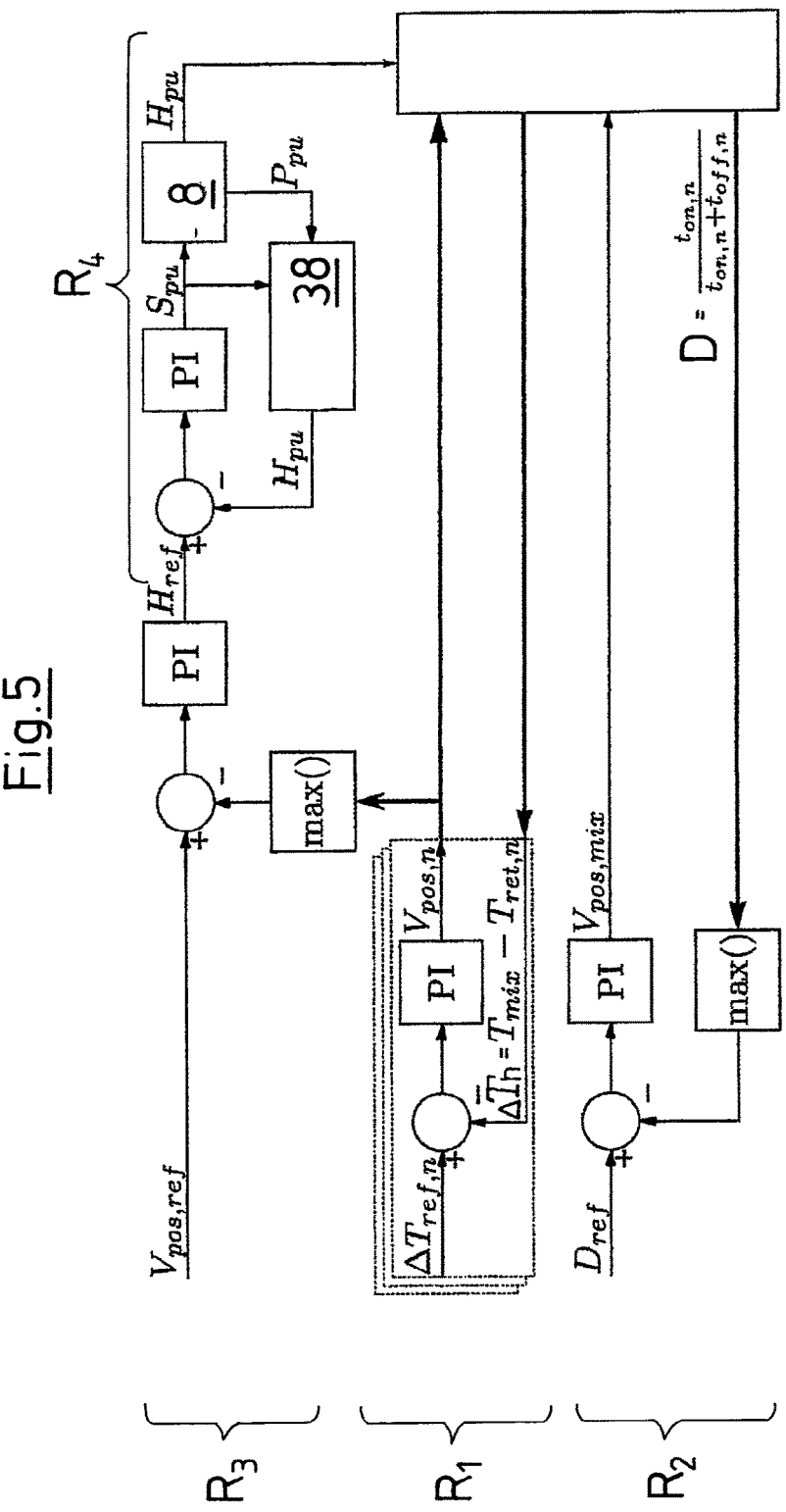
FIG. 5 is a schematic view showing the cooperation of individual parts of a regulating method according to the invention.

A further control loop or a further regulating method which is carried out by the control device 10 relates to the regulation of the feed temperature $T_{mix}$ at the entry 30 of the load circuits 6 and which is detected by the feed temperature sensor 26. The feed temperature $T_{mix}$ can be changed or set by the control device 10 by way of activation of the mixing valve 18. For this, the control device 10 forms a feed temperature setting device which sets the feed temperature $T_{mix}$, i.e. its setpoint in dependence on the switch-on duration, i.e. the relative switch-on duration D of the load circuits 6. The significance of the relative switch-on duration D is described in more detail by way of FIG. 4. FIG. 4 for a load circuit 4 shows how this is switched on and off in an alternating manner. "1" thereby means switched-on and "0" means switched-off. The load circuit is switched on for the time duration $t_{on}$, and the load circuit is switched off for the time duration $t_{off}$. The cycle time $t_z$ thereby corresponds to the sum of the switch-on time and switch-off time, i.e. $t_z = t_{on} + t_{off}$. The relative switch-on duration D is the ratio of the switch-on time $t_{on}$ to the cycle time $t_z$, as is represented in FIG. 5. The cycle time or cycle duration $t_z$ is thus the time interval between the switching-on of the load circuit 6 and the subsequent next switching-on of the load circuit 6. The switching-on and switching-off of the load circuit results from the signals of the associated room thermostats 34. If in the case of a heating system, the room thermostat 34 notes that a set desired temperature is fallen short off, the control device 10 switches on the load circuit 6 associated with the room, by way of opening the associated regulating valve 24. The volume flow regulation described above for the respective load circuit 6 is then effected. If the room thermostat 34 notes that the set temperature setpoint is reached, the control device 10 switches off the load circuit 6 belonging to the room, by way of completer closure of the regulating valve 24.

The feed temperature $T_{mix}$ and its setpoint is the same for all load circuits 6 and is set by the control device 10 in dependence on that load circuit 6 which has the longest relative switch-on duration D, i.e. the relatively largest load cycle. This is the load circuit 6 with the greatest thermal or cooling requirement, so that it is useful to adequately set the feed temperature $T_{mix}$ for this load circuit 6. The remaining load circuits 6 which have lower relative switch-on durations D accordingly have a lower energy requirement, so that the set feed temperature $T_{mix}$ for these load circuits is likewise sufficient. The setting of the feed temperature $T_{mix}$ is effected in a manner such that the relative switch-on duration D is compared to a limit value or a desired switch-on duration $D_{ref}$. If the relative switch-on duration D exceeds the desired switch-on duration $D_{ref}$, the feed temperature $T_{mix}$ respectively at first its setpoint is increased in the case of a heating, and the feed temperature $T_{mix}$ respectively its setpoint is reduced in the case of a cooling system. Vice versa, for the case that the relative switch-on duration D falls short of the desired switch-on duration $D_{ref}$, the feed temperature $T_{mix}$ respectively its setpoint is reduced in the case of a heating, and increased in the case of a cooling system. This is preferably effected proportionally to the deviation of the switch-on duration D from the desired switch-on duration $D_{ref}$. Alternatively, a change can also be effected in fixed steps. The desired switch-on duration $D_{ref}$ is stored as a preset value in the control device 10.

It is shown in FIG. 5 as to how the individual regulating methods or control loops cooperate. All the previously described control loops or regulating methods are preferably carried out continuously and simultaneously. The first control loops $R_1$ which are shown in FIG. 5 relate to the volume flow regulation for the individual load circuits 6. Thereby, a regulation for each load circuit 6 is effected independently, i.e. for each load circuit 6 the differential temperature $\Delta T_n$ ($\Delta T_n = T_{mix} - T_{ret,n}$, wherein $T_{ret,n}$ is the exit temperature of the respective load circuit which is detected by the associated temperature sensor 28) is compared to the temperature difference setpoint $\Delta T_{ref}$. The counter n in FIG. 5 indicates the respective load circuit 6. The temperature difference setpoint $\Delta T$ can also be differently defined for individually load circuits 6 and be stored in the control device 10. Alternatively, it is also possible to apply the same temperature different value $\Delta T_{ref}$ for all load circuits. However, it is always the actual exit temperature $T_{ref,n}$ of the respective load circuit which forms the basis of for the regulation, i.e. the exit temperature $T_{ref1}$ for the first load circuit 6, the exit temperature $T_{ref2}$ for the second load circuit, etc. The opening degree $V_{pos,n}$ for the associated regulating valve 24 is set by the control device 10 in dependence on the comparison of the differential temperature $\Delta T_n$ with the temperature difference setpoint $\Delta tref$.

A second control loop $R_2$ which is represented in FIG. 5, relates to the previously described setting of the feed temperature $T_{mix}$ by way of the control of the mixing valve 18. For this, a control variable $V_{pos,mix}$ which corresponds to the opening degree of the mixing valve 18, is set by the control device 10 by way of the relative switch-on duration D being compared to the desired switch-on duration $D_{ref}$ in the manner described above.

A third control loop $R_3$ and a fourth control loop $R_4$ which are shown in FIG. 5 and are implemented in the control device 10, relate to the differential pressure regulation in the circulation pump assembly 8. Thus, the differential pressure $H_{pu}$ between the entry and exit of the circulation pump assembly 8, i.e. between the entry and exit of the load circuits 6 is regulated to a pressure difference setpoint $H_{ref}$, which is effected in the control loop $R_4$. Moreover the pressure difference setpoint $H_{ref}$ for its part is regulated and set in the control loop $R_3$, which is effected in the manner described above in dependence on the opening degree $V_{pos,n}$ of the regulating valve 24. For this, the regulating valve 24 is with the greatest opening degree $V_{pos}$ is considered and is compared to a desired opening degree $V_{pos,ref}$. If the desired opening degree $V_{pos,ref}$ is fallen short of, then the pressure difference setpoint $H_{ref}$ is increased proportionally. If the desired opening degree $V_{pos,ref}$ is exceeded, accordingly the pressure difference setpoint $H_{ref}$ is reduced. As is likewise represented in FIG. 5, the circulation pump assembly 8 comprises a detection device 38 which estimates or determines the actual pressure difference $H_{pu}$ from the speed $S_{pu}$ and the electrical power $P_{pu}$.

The four shown control lops $R_1$, $R_2$, $R_3$, $R_4$ are differently quick and differently sluggish, so that they preferably do not interact with one another, i.e. they do not mutually influence one another. The quickest control loop is the control loop $R_4$ which regulates the pressure difference $H_{pu}$ across the circulation pump assembly 8 to the pressure difference setpoint $H_{ref}$. The next slower control loop is the control loop $R_1$ which regulates the volume flow through the individual load circuits 6. Even slower is the control loop $R_3$ which regulates the pressure difference setpoint $H_{ref}$. This control loop is so slow that this regulation preferably does not influence the control loop $R_1$. In FIG. 5 not shown are two further control loops, namely the control loop for regulating the room temperature by switching-on and switching-off the load circuit 6 as well as the control loop which regulates the feed temperature on the elected feed temperature setpoint. These two control loops are preferably designed still slower than the preceding described load circuits whereas that load circuit which sets the feed temperature is preferably the slowest load circuit.

Apart from the regulation method described above, the control device 10 can also assume further functions. It is possible to store certain priorities for the individual load circuits 6 in the control device 10, since this control device communicates with room thermostats 34 and switches on the load circuits 6 by way of opening the regulating valves 24, in dependence on the signals from the room thermostats 34. Thus, with a heating system and when very cold, it is possible for example to not simultaneously activate all load circuits 6 in the case that the heat quantity made available by the boiler would not be sufficient. For heating, firstly prioritised heating circuits such as for example living rooms or bath can be switched on, and less important load circuits 6, for example for heating bedrooms can firstly remain switched off. Thereby, the control device 10 can automatically detect that the heating power available is not sufficient, specifically when all regulating valves 34 are opened, i.e. have the maximal opening degree and despite this the temperature difference $\Delta T$ between the entry 30 and the exit 22 becomes too large. This functions in a corresponding manner also with a cooling system, but in reverse. The priority of the load circuits 6 can be preset and be stored in the control device 10. Moreover, the control device 10 can also be designed such that for heating rooms, it increases the feed temperature $T_{mix}$ for a certain time above the usually sought setpoint resulting from the previously described regulation, in order to permit a rapid heating of the rooms.

Finally, the control device 10 can also have a diagnosis function or diagnosis module which diagnoses the correct function of the regulating valves 24 as well as of the load circuits 6. Thus, the control device 10 in a diagnosis mode can individually open the regulating valves 24 of the load circuits 6 or increase or reduce the opening degree of the regulating valves 24, ideally to the maximum. Thereby, in each case only one regulating valve 24 is opened and closed further departing from an initial opening degree, whilst the other regulating valves 24 remain unchanged or closed. Preferably the regulating valve 24 of the load circuit 6 which has to be rechecked is further opened. Subsequently, the flow through the circulation pump assembly 8 as well as the differential pressure across the circulation pump assembly 8 is detected and the hydraulic resistance of the system respectively a change of the hydraulic resistance is determined from this. The control device 10 also receives information or signals from the circulation pump assembly 8 which specifies the flow and the differential pressure. The control device 10 compares the determined hydraulic resistance with a maximum hydraulic resistance with is predefined for the system and which is stored in the control device 10. If the detected hydraulic resistance exceeds the predefined maximum hydraulic resistance, this indicates an error and the control device 10 signalises this error, so that the system can be subsequently examined. If the hydraulic resistance before and after the opening of the regulating valve 24 are compared to one another, then the correction function of the regulating valve 24 can be determined from this. Moreover, the hydraulic resistance can also be compared to a minimal value in the control device 10. If a stored minimal value is fallen short of, then likewise a malfunction can be deduced from this.

The diagnostic function described above can be also realized so that the pressure loss and hence, the hydraulic resistance is taken into account only the individual load circuits 6 or determined by the control device 10. This can also be done by knowing the characteristics of the valves lying in the flow path, especially the check valve 20 and the regulating valve 24 taking into account the known opening degree of the valves 24. If the pressure losses of the valves are known in the given operating state, then the proportion of the total pressure loss of the circulation pump 8 which is provided between input and output can be determined, which is caused by the respective load circuit 6 itself. Accordingly, the permissible limits for the pressure loss and the hydraulic resistance of the load circuit 6 itself can be parked. I.e., it will only take into account the hydraulic resistance of the load circuit in the comparison with the permissible limits, the limits are limits for the hydraulic resistance of the load circuit.

Figure 2:
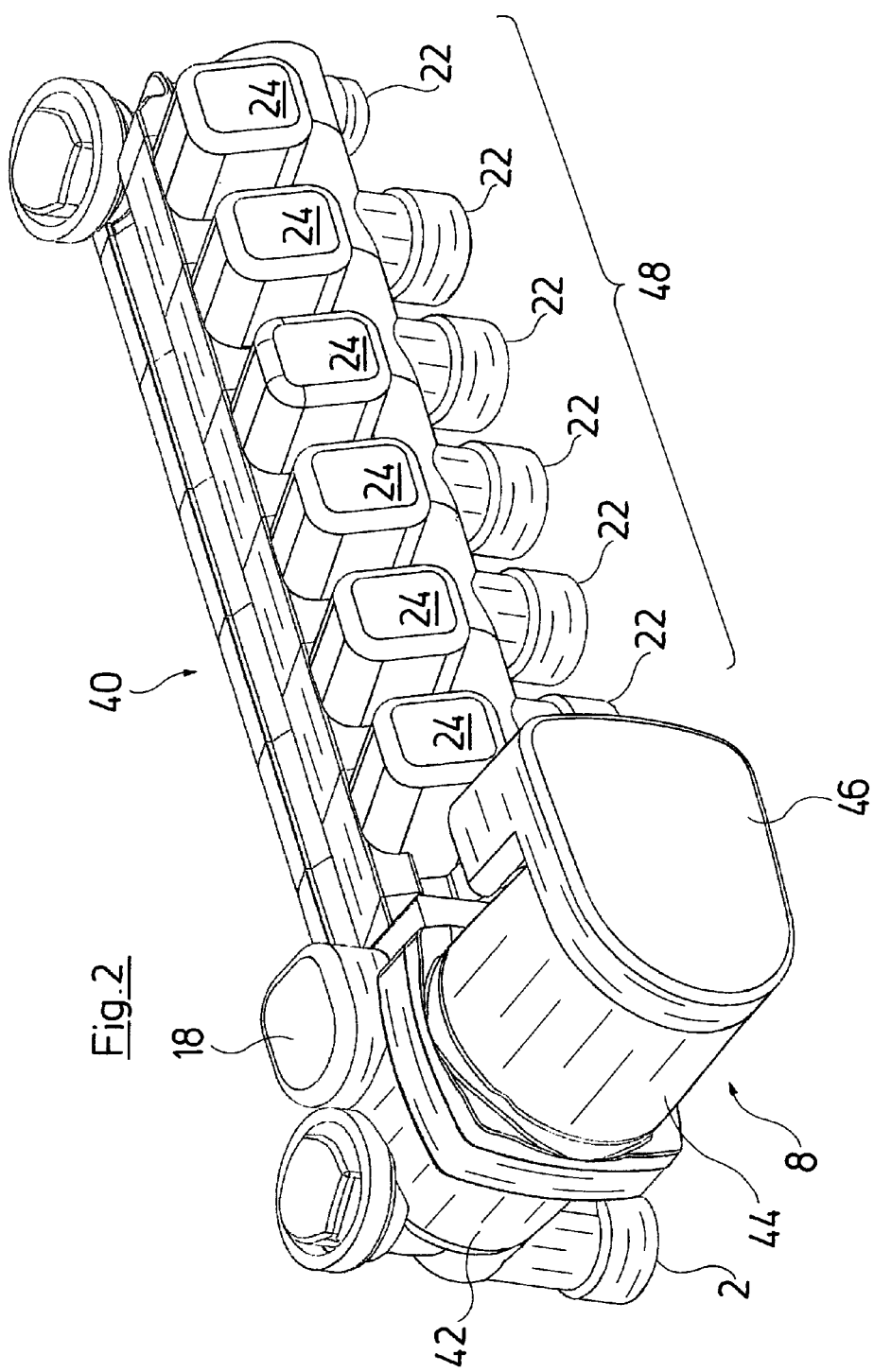
FIG. 2 is a schematic perspective view showing a manifold device according to the invention.
Figure 3:
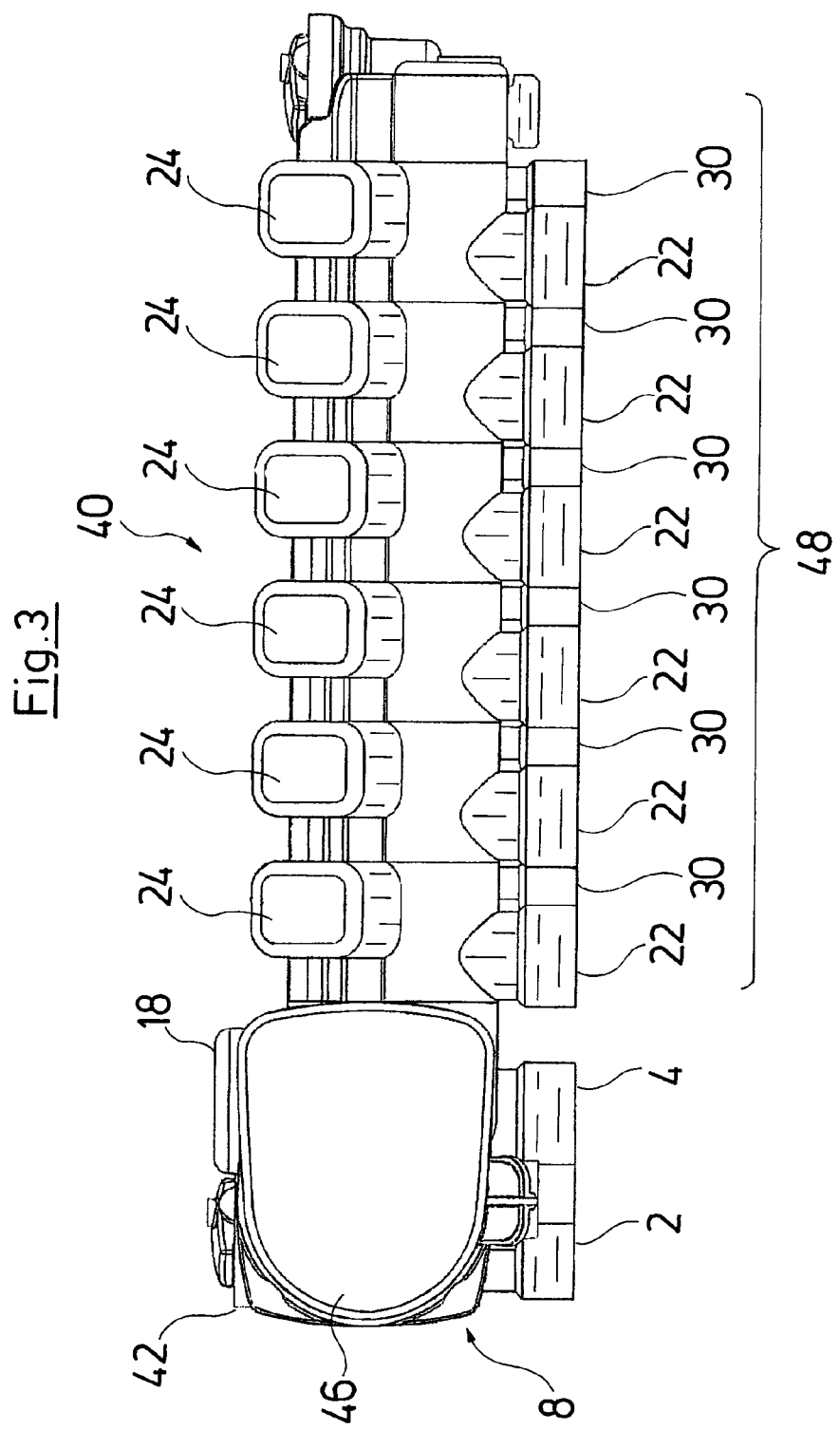
FIG. 3 is a plan view of the manifold device according to FIG. 2.

The essential components of the heating system shown in FIG. 1 are preferably integrated into a manifold device in the form of a heating manifold, as is shown in FIGS. 2 and 3. Thereby, all essential components lying within the dashed line in FIG. 1 are integrated into the manifold device in the form of a construction unit. Thus, the heating manifold 40 which is shown in FIGS. 2 and 3 as a central component comprises the circulation pump assembly 8. This comprises a pump housing 42, in which a rotatable impeller is arranged. The impeller is driven by an electric drive motor which is arranged in a motor housing or stator housing 44. A terminal box or electronics housing 46, in which the control device 10 is accommodated, is arranged on the axial end of the stator housing 44 which is away from the pump housing 42. The pump housing 42 compromises the inlet 2 as well as the outlet 4 in the form of connections of external pipe conduits. Moreover, the mixing valve 18 is arranged in the pump housing, and the mixing conduit 12 with the mixing point 16 is formed in the pump housing. The pump housing 42 is connected at one side to the actual manifold 48. The manifold 48 comprises modules 50 for the individual load circuits, in this case six load circuits 6. The regulating valves 24 as well as connections which form the entries 30 for the load circuits 6 are arranged in the modules 50. Moreover, each module 50 comprises a connection which forms the exit 22 for the respective load circuit 6. Pipe conduits which form the load circuits 6, for example pipe conduits of a floor heating are be connected to the connections forming the entries 30 and the exits 22. A feed conduit and a return conduit which are connected to the pump housing 42 are arranged in the manifold 48, wherein the return conduit is connected to the return 14 in the pump housing and the feed conduit is connected to the exit side of the circulation pump 8. The temperature sensors 26 and 28 are also integrated into the manifold 48 or the pump housing 42. Thus preferably, only the room thermostats 34 with their radio interfaces 36 form external components of the regulation technology, which however can be easily connected by way of the radio connection to the communication interface 32 of the control device 10 which is arranged in the electronics housing 46. All other necessary electric and/or electronic components for the control and/or regulation are integrated into the heating manifold 40 as a premanufactured construction unit.

While specific embodiments of the invention have been shown and described in detail to illustrate the application of the principles of the invention, it will be understood that the invention may be embodied otherwise without departing from such principles.

APPENDIX

List of Reference Numerals

2—inlet
4—outlet
6—load circuits
8—circulation pump assembly
10—control device
12—mixing conduit
14—return
16—mixing point
17—branching
18—mixing valve
20—check valve
22—exits
24—regulating valve
26—feed temperature sensor
28—temperature sensors
30—inputs
32—communication interface
34—room thermostat
36—radio interface
38—detection device
40—heating manifold
42—pump housing
44—stator housing
46—electronics housing
48—manifold
$R_1, R_2, R_3, R_4$—control loops
$T_{mix}$—feed temperature
$T_{ret,n}$—exit temperature
$\Delta T$—temperature difference
$\Delta T_{ref}$—temperature difference setpoint
$H_{pu}$—differential pressure
$H_{ref}$—pressure difference setpoint
$V_{pos,ref}$—desired opening degree
$V_{pos,mix}$—opening degree of mixing valve 18
$V_{pos,n}$—opening degree of regulating valve 24
D—relative switch-on duration
$D_{ref}$—desired switch-on duration
$t_z$—cycle time
$t_{on}$—switch-on time
$t_{off}$—switch-off time
$S_{pu}$—speed
$P_{pu}$—power

What is claimed is:

1. A regulating method for a heating and/or cooling system, the regulating method comprising the steps of:
   providing at least one load circuit, through which a fluid as a heat transfer medium flows;
   switching the at least one load circuit on and off in dependence on a room temperature in a room to be thermally regulated by the load circuit; and
   setting a feed temperature of the fluid fed to the at least one load circuit in dependence on the relative switch-on duration of the at least one load circuit, the relative switch-on duration corresponding to a ratio of the switch-on duration to a time interval between a switching-on of the at least one load circuit and a subsequent, renewed switching-on of the at least one load circuit.

2. A regulating method according to claim 1, wherein the load circuit is used for heating the room and at least one of:
   the feed temperature is increased if the relative switch-on duration exceeds a predefined limit value; and
   the feed temperature is lowered if the switch-on duration falls short of a predefined limit value.

3. A regulating method according to claim 2, wherein the feed temperature is changed by a proportional amount on falling short of or exceeding the predefined limit value.

4. A regulating method according to claim 1, wherein the load circuit is used for cooling the room and at least one of:
   the feed temperature is lowered if the relative switch-on duration exceeds a predefined limit value; and
   the feed temperature is increased if the relative switch-on duration falls short of a predefined limit value.

5. A regulating method according to claim 4, wherein the feed temperature is changed by a proportional amount on falling short of or exceeding the predefined limit value.

6. A regulating method according to claim 1, further comprising the steps of:
providing a mixing device;
using the mixing device for setting the feed temperature such that fluid fed to the at least one load circuit is mixed with fluid from the return of the at least one load circuit.

7. A regulating method according to claim 1, wherein several load circuits are provided and the relative switch-on duration of that load circuit having the longest relative switch-on durations forms the basis for setting the feed temperature of a fluid fed to all load circuits.

8. A regulating method according to claim 1, wherein the room temperature is detected in the room to be thermally regulated by the load circuit, and the load circuit is switched off by way of interrupting the volume flow if the room temperature reaches a temperature setpoint.

9. A regulating method according to claim 1, wherein an entry temperature of the fluid at an entry of the load circuit and an exit temperature of the fluid at an exit of the load circuit are detected, a temperature difference between the entry temperature and the exit temperature is determined, and a volume flow of the fluid through this load circuit is set in dependence on the temperature difference.

10. A regulating method according to claim 1, further comprising the steps of:
providing a circulation pump, wherein several load circuits are provided and the circulation pump is provided for the several load circuits;
delivering fluid with the circulation pump;
regulating a speed of the circulation pump in a manner such that a differential pressure across the circulation pump corresponds to a predefined pressure difference setpoint.

11. A regulating method according to claim 10, wherein the pressure difference setpoint for the differential pressure across the circulation pump is set in dependence on the opening degree of at least one of the regulating valves for setting the volume flow in the load circuits.

12. A regulating method according to claim 11, wherein for setting the pressure difference setpoint for the differential pressure across the circulation pump, a regulating valve which is open the furthest is considered, wherein an opening degree of said regulating valve which is open the furthest is compared to a desired opening degree, and the pressure difference setpoint is increased on exceeding the desired opening degree, and the pressure difference setpoint is reduced on falling short of the desired opening degree.

13. A manifold device for a heating and/or cooling system, the manifold device comprising:
at least one load circuit through which a fluid as a heat transfer medium flows;
a control device configured for carrying out a regulating method, the regulating method comprising the steps of:
switching the at least one load circuit on and off in dependence on a room temperature in a room to be thermally regulated by the load circuit; and
setting a feed temperature of the fluid fed to the at least one load circuit in dependence on the relative switch-on duration of the at least one load circuit, the relative switch-on duration corresponding to a ratio of the switch-on duration to a time interval between a switching-on of the at least one load circuit and a subsequent, renewed switching-on of the at least one load circuit.

14. A manifold device according to claim 13, further comprising a feed temperature setting device comprising a mixing device in which fluid fed to the at least one load circuit is mixed with fluid from a return of the at least one load circuit.

15. A manifold device according to claim 13, wherein the mixing device comprises a fluid feed or a mixing conduit connecting the return of the load circuit to the entry of the at least one load circuit and a valve regulating the flow, wherein a valve opening degree is settable by the control device.

16. A manifold device according to claim 13, further comprising another load circuit such that several load circuits are provided, wherein the feed temperature setting device sets the feed temperature of a fluid fed to all load circuits.

* * * * *